United States Patent
Ward et al.

(10) Patent No.: US 9,885,497 B2
(45) Date of Patent: Feb. 6, 2018

(54) METHOD FOR OPERATING A WATER HEATER APPLIANCE

(71) Applicant: General Electric Company, Schenectady, NY (US)

(72) Inventors: Shaun Michael Ward, Louisville, KY (US); Timothy Scott Shaffer, La Grange, KY (US); Brett Alan Farris, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 335 days.

(21) Appl. No.: 14/692,803

(22) Filed: Apr. 22, 2015

(65) Prior Publication Data

US 2016/0313029 A1 Oct. 27, 2016

(51) Int. Cl.
*F24H 1/18* (2006.01)
*F24H 9/20* (2006.01)

(52) U.S. Cl.
CPC .................... *F24H 9/2007* (2013.01)

(58) Field of Classification Search
CPC ... F24H 1/18; F24H 9/12; F24H 9/122; F24H 9/126; F24H 9/144; F24H 9/2007
See application file for complete search history.

(56) References Cited

U.S. PATENT DOCUMENTS

| 4,854,498 | A | * | 8/1989 | Stayton | G05D 23/1393 236/12.12 |
| 4,941,608 | A | * | 7/1990 | Shimizu | G05D 23/1393 236/12.12 |
| 4,969,598 | A | | 11/1990 | Garris | |
| 6,283,447 | B1 | * | 9/2001 | Fleet | F16K 35/025 251/285 |
| 6,629,645 | B2 | * | 10/2003 | Mountford | G05D 23/1393 236/12.12 |
| 8,910,650 | B2 | * | 12/2014 | Andersen | F16K 1/54 137/15.06 |
| 2010/0032488 | A1 | * | 2/2010 | Yates | G05D 23/1393 236/12.1 |
| 2017/0122458 | A1 | * | 5/2017 | Farris | F16K 37/0091 |

FOREIGN PATENT DOCUMENTS

| JP | S 61190616 A | | 8/1986 |
| JP | H 06288612 A | | 10/1994 |
| JP | 2011149605 A | * | 8/2011 |

\* cited by examiner

*Primary Examiner* — Nathaniel Herzfeld
(74) *Attorney, Agent, or Firm* — Dority & Manning, P.A.

(57) ABSTRACT

A method for operating a water heater appliance includes determining a temperature, $T_{tank}$, of water within a tank of the water heater appliance, a temperature, $T_{cold}$, of water at an inlet conduit of the water heater appliance and an actual position, $VMP_{actual}$, of a mixing valve of the water heater appliance. The method also includes calculating a theoretical position, $VMP_{theoretical}$, of the mixing valve of the water heater appliance and establishing a lower flow rate limit for water exiting the water heater appliance and an upper flow rate limit for water exiting the water heater appliance.

20 Claims, 4 Drawing Sheets

US 9,885,497 B2

METHOD FOR OPERATING A WATER HEATER APPLIANCE

FIELD OF THE INVENTION

The present subject matter relates generally to water heater appliance and methods for operating the same.

BACKGROUND OF THE INVENTION

Certain water heater appliances include a tank therein. Heating elements, such as gas burners, electric resistance elements, or induction elements, heat water within the tank during operation of such water heater appliances. In particular, the heating elements generally heat water within the tank to a predetermined temperature. The predetermined temperature is generally selected such that heated water within the tank is suitable for showering, washing hands, etc.

During operation, relatively cool water flows into the tank, and the heating elements operate to heat such water to the predetermined temperature. Thus, the volume of heated water available at the predetermined temperature is generally limited to the volume of the tank. According, water heater appliances are sold in various sizes to permit consumers to select a proper tank volume and provide sufficient heated water. However, large water heater appliances with large tanks occupy large amount of space within a residence or business. In certain buildings, space is limited and/or expensive. Thus, utilizing large water heater appliances can be impractical and/or prohibitively expensive despite needing large volumes of heated water.

To provide relatively large volumes of heated water from relatively small tanks, certain water heater appliances utilize a mixing valve. The mixing valve permits water within the water heater's tank to be stored at relatively high temperatures. The mixing valve mixes such high temperature water with relatively cool water in order to bring the temperature of such water down to suitable and/or more usable temperatures. Thus, such water heater appliance can provide relatively large volumes of heated water without requiring large tanks.

To operate efficiently, water heater appliances with mixing valves generally determine whether hot water is in demand or is flowing. When water is flowing through the mixing valve, the mixing valve adjusts the ratio of relatively hot water and relatively cold water in order to control the temperature of water supplied downstream. Certain water heater appliances utilize a flowmeter or a flow sensor to determine a flow rate of water through the mixing valve, but such devices can be unreliable. In particular, flowmeters and flow sensors include moving components that can clog or otherwise malfunction due to hard water or debris.

Accordingly, a water heater appliance having a mixing valve that includes features for determining a flow rate of water through the mixing valve would be useful. In particular, a water heater appliance having a mixing valve that includes features for determining a flow rate of water through the mixing valve without using a flowmeter or a flow sensor would be useful.

BRIEF DESCRIPTION OF THE INVENTION

The present subject matter provides a method for operating a water heater appliance. The method includes determining a temperature, $T_{tank}$, of water within a tank of the water heater appliance, a temperature, $T_{cold}$, of water at an inlet conduit of the water heater appliance and an actual position, $VMP_{actual}$, of a mixing valve of the water heater appliance. The method also includes calculating a theoretical position, $VMP_{theoretical}$, of the mixing valve of the water heater appliance and establishing a lower flow rate limit for water exiting the water heater appliance and an upper flow rate limit for water exiting the water heater appliance. Additional aspects and advantages of the invention will be set forth in part in the following description, or may be apparent from the description, or may be learned through practice of the invention.

In a first exemplary embodiment, a method for operating a water heater appliance is provided. The method includes determining a temperature, $T_{tank}$, of water within a tank of the water heater appliance, a temperature, $T_{cold}$, of water at an inlet conduit of the water heater appliance and an actual position, $VMP_{actual}$, of a mixing valve of the water heater appliance. The method also includes calculating a theoretical position, $VMP_{theoretical}$, of the mixing valve of the water heater appliance. The $VMP_{theoretical}$ is a function of at least the $T_{tank}$ and the $T_{cold}$. The method further includes evaluating a difference between the $VMP_{actual}$ and the $VMP_{theoretical}$, $\Delta VMP$, and establishing a lower flow rate limit for water exiting the water heater appliance and an upper flow rate limit for water exiting the water heater appliance. The lower flow rate limit and the upper flow rate limit are each a function of at least the $\Delta VMP$.

In a second exemplary embodiment, a method for operating a water heater appliance is provided. The water heater appliance has a mixing valve positioned within a casing of the water heater appliance. The method includes determining a temperature, $T_{tank}$, of water within a tank of the water heater appliance, a temperature, $T_{cold}$, of water at an inlet conduit of the water heater appliance and an actual position, $VMP_{actual}$, of a mixing valve of the water heater appliance. The method also includes calculating a theoretical position, $VMP_{theoretical}$, of the mixing valve of the water heater appliance. The $VMP_{theoretical}$ theoretical is a function of at least the $T_{tank}$ and the $T_{cold}$. The method further includes evaluating a difference between the $VMP_{actual}$ and the $VMP_{theoretical}$, $\Delta VMP$ and establishing a lower flow rate limit for water exiting the water heater appliance and an upper flow rate limit for water exiting the water heater appliance. The lower flow rate limit and the upper flow rate limit are each a function of at least the $\Delta VMP$. The method also includes estimating a flow rate of water through the water heater appliance based at least in part on the lower flow rate limit and the upper flow rate limit.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
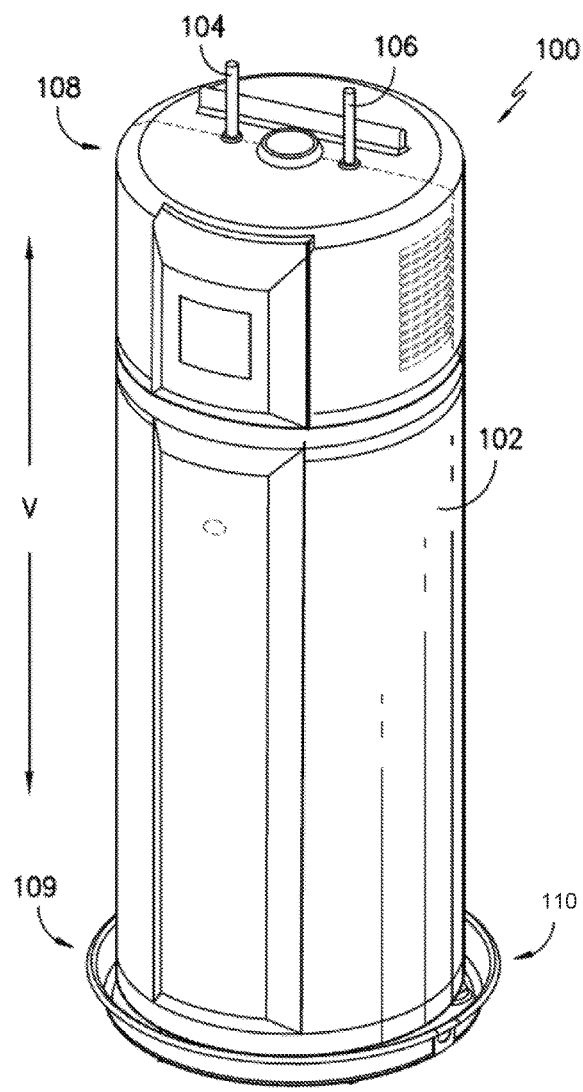
FIG. 1 provides a perspective view of a water heater appliance according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a perspective view of a water heater appliance 100 according to an exemplary embodiment of the present subject matter. Water heater appliance 100 includes a casing 102. A tank 101 (FIG. 2) and heating elements 103 (FIG. 2) are positioned within casing 102 for heating water therein. Heating elements 103 may include a gas burner, a heat pump, an electric resistance element, a microwave element, an induction element, or any other suitable heating element or combination thereof. As will be understood by those skilled in the art and as used herein, the term "water" includes purified water and solutions or mixtures containing water and, e.g., elements (such as calcium, chlorine, and fluorine), salts, bacteria, nitrates, organics, and other chemical compounds or substances.

Water heater appliance 100 also includes a cold water conduit 104 and a hot water conduit 106 that are both in fluid communication with a chamber 111 (FIG. 2) defined by tank 101. As an example, cold water from a water source, e.g., a municipal water supply or a well, can enter water heater appliance 100 through cold water conduit 104 (shown schematically with arrow labeled $F_{cool}$ in FIG. 2). From cold water conduit 104, such cold water can enter chamber 111 of tank 101 wherein it is heated with heating elements 103 to generate heated water. Such heated water can exit water heater appliance 100 at hot water conduit 106 and, e.g., be supplied to a bath, shower, sink, or any other suitable feature, as discussed in greater detail below.

Water heater appliance 100 extends longitudinally between a top portion 108 and a bottom portion 109 along a vertical direction V. Thus, water heater appliance 100 is generally vertically oriented. Water heater appliance 100 can be leveled, e.g., such that casing 102 is plumb in the vertical direction V, in order to facilitate proper operation of water heater appliance 100. A drain pan 110 is positioned at bottom portion 109 of water heater appliance 100 such that water heater appliance 100 sits on drain pan 110. Drain pan 110 sits beneath water heater appliance 100 along the vertical direction V, e.g., to collect water that leaks from water heater appliance 100 or water that condenses on an evaporator (not shown) of water heater appliance 100. It should be understood that water heater appliance 100 is provided by way of example only and that the present subject matter may be used with any suitable water heater appliance.

Figure 2:
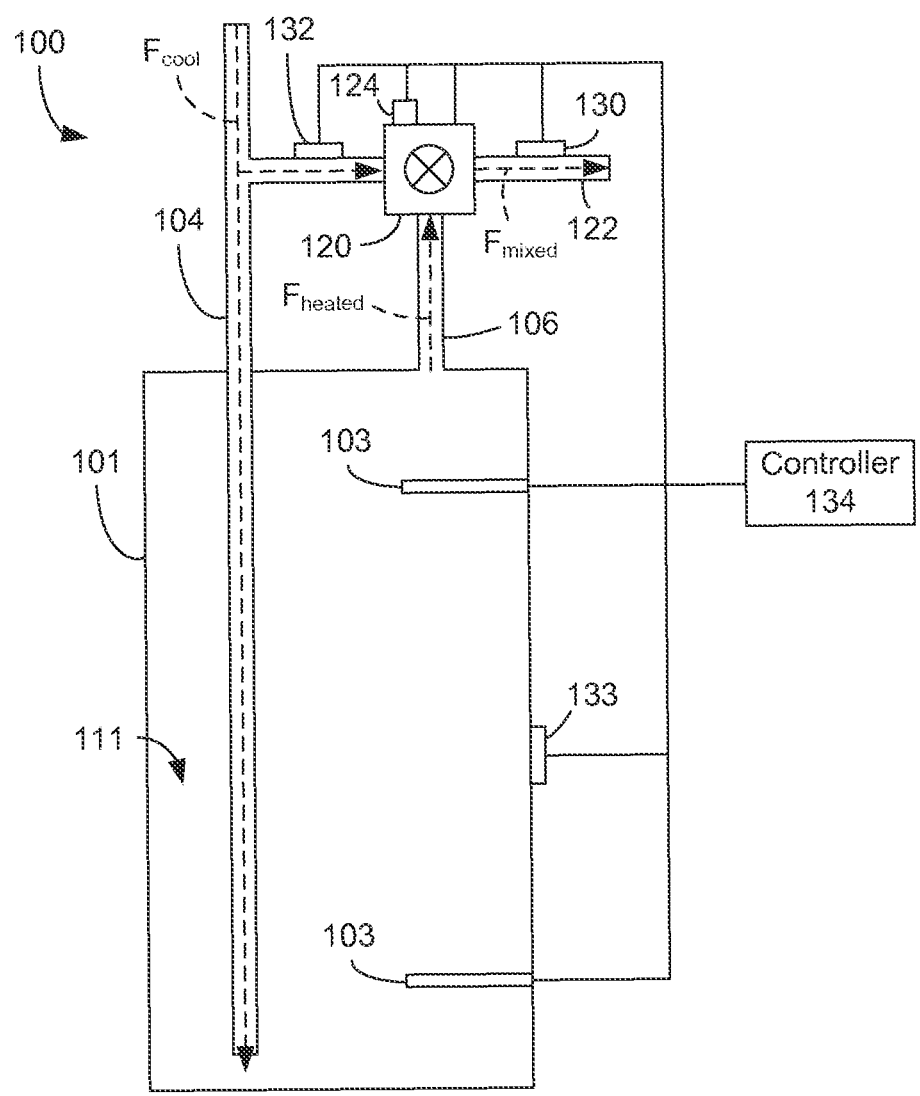
FIG. 2 provides a schematic view of certain components of the exemplary water heater appliance of FIG. 1.

FIG. 2 provides a schematic view of certain components of water heater appliance 100. As may be seen in FIG. 2, water heater appliance 100 includes a mixing valve 120 and a mixed water conduit 122. Mixing valve 120 is in fluid communication with cold water conduit 104, hot water conduit 106, and mixed water conduit 122. As discussed in greater detail below, mixing valve 120 is configured for selectively directing water from cold water conduit 104 and hot water conduit 106 into mixed water conduit 122 in order to regulate a temperature of water within mixed water conduit 122. Mixing valve 120 may be positioned or disposed within casing 102 of water heater appliance 100, e.g., such that mixing valve 120 is integrated within water heater appliance 100.

As an example, mixing valve 120 can selectively adjust between a first position and a second position. In the first position, mixing valve 120 can permit a first flow rate of relatively cool water from cold water conduit 104 (shown schematically with arrow labeled $F_{cool}$ in FIG. 2) into mixed water conduit 122 and mixing valve 120 can also permit a first flow rate of relatively hot water from hot water conduit 106 (shown schematically with arrow labeled $F_{heated}$ in FIG. 2) into mixed water conduit 122. In such a manner, water within mixed water conduit 122 (shown schematically with arrow labeled $F_{mixed}$ in FIG. 2) can have a first particular temperature when mixing valve 120 is in the first position. Similarly, mixing valve 120 can permit a second flow rate of relatively cool water from cold water conduit 104 into mixed water conduit 122 and mixing valve 120 can also permit a second flow rate of relatively hot water from hot water conduit 106 into mixed water conduit 122 in the second position. The first and second flow rates of the relatively cool water and relatively hot water are different such that water within mixed water conduit 122 can have a second particular temperature when mixing valve 120 is in the second position. In such a manner, mixing valve 120 can regulate the temperature of water within mixed water conduit 122 and adjust the temperature of water within mixed water conduit 122 between the first and second particular temperatures.

It should be understood that, in certain exemplary embodiments, mixing valve 120 is adjustable between more positions than the first and second positions. In particular, mixing valve 120 may be adjustable between any suitable number of positions in alternative exemplary embodiments. For example, mixing valve 120 may be infinitely adjustable in order to permit fine-tuning of the temperature of water within mixed water conduit 122.

Water heater appliance 100 also includes a position sensor 124. Position sensor 124 is configured for determining a position of mixing valve 120. Position sensor 124 can monitor the position of mixing valve 120 in order to assist with regulating the temperature of water within mixed water conduit 122. For example, position sensor 124 can determine when mixing valve 120 is in the first position or the second position in order to ensure that mixing valve 120 is properly or suitably positioned depending upon the temperature of water within mixed water conduit 122 desired or selected. Thus, position sensor 124 can provide feedback regarding the status or position of mixing valve 120.

Position sensor 124 may be any suitable type of sensor. For example, position sensor 124 may be a physical sensor, such as an optical sensor, Hall-effect sensor, etc. In alternative exemplary embodiments, water heater appliance 100 need not include position sensor 124, and controller 134 may determine or measure a motor position of mixing valve 120 based on a previously commanded position of mixing valve 120. Thus, controller 134 may determine that the current position of mixing valve 120 corresponds to a latest position that controller 134 commanded for mixing valve 120 in a previous iteration.

Water heater appliance 100 also includes a mixed water conduit temperature sensor or first temperature sensor 130 and a cold water conduit temperature sensor or second temperature sensor 132. First temperature sensor 130 is positioned on or proximate mixed water conduit 122 and is configured for measuring a temperature of water within mixed water conduit 122. First temperature sensor 130 is also positioned downstream of mixing valve 120. Second temperature sensor 132 is positioned on or proximate cold water conduit 104 and is configured for measuring a temperature of water within cold water conduit 104. Second temperature sensor 132 is positioned upstream of mixing valve 120. In certain exemplary embodiments, first temperature sensor 130 and/or second temperature sensor 132 may be positioned proximate or adjacent mixing valve 120.

Water heater appliance 100 also includes a tank temperature sensor 133 that is configured for measuring a temperature of water within chamber 111 of tank 101. Tank temperature sensor 133 can be positioned at any suitable location within water heater appliance 100. For example, tank temperature sensor 133 may be positioned within chamber 111 of tank 101 or may be mounted to tank 101 outside of chamber 111 of tank 101. When mounted to tank 101 outside of chamber 111 of tank 101, tank temperature sensor 133 can be configured for indirectly measuring the temperature of water within chamber 111 of tank 101. For example, tank temperature sensor 133 can measure the temperature of tank 101 and correlate the temperature of tank 101 to the temperature of water within chamber 111 of tank 101. Tank temperature sensor 133 can be any suitable temperature sensor. For example, tank temperature sensor 133 may be a thermocouple or a thermistor.

Water heater appliance 100 further includes a controller 134 that is configured for regulating operation of water heater appliance 100. Controller 134 is in, e.g., operative, communication with heating elements 103, mixing valve 120, position sensor 124, first and second temperature sensors 130 and 132 and tank temperature sensor 133. Thus, controller 134 can selectively activate heating elements 103 in order to heat water within chamber 102 of tank 101. Similarly, controller 134 can selectively operate mixing valve 120 in order to adjust a position of mixing valve 120 and regulate a temperature of water within mixed water conduit 122.

Controller 134 includes memory and one or more processing devices such as microprocessors, CPUs or the like, such as general or special purpose microprocessors operable to execute programming instructions or micro-control code associated with operation of water heater appliance 100. The memory can represent random access memory such as DRAM, or read only memory such as ROM or FLASH. The processor executes programming instructions stored in the memory. The memory can be a separate component from the processor or can be included onboard within the processor. Alternatively, controller 134 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Controller 134 can be positioned at a variety of locations. In the exemplary embodiment shown in FIG. 1, controller 134 is positioned within water heater appliance 100, e.g., as an integral component of water heater appliance 100. In alternative exemplary embodiments, controller 134 may positioned away from water heater appliance 100 and communicate with water heater appliance 100 over a wireless connection or any other suitable connection, such as a wired connection.

Controller 134 can operate heating elements 103 to heat water within chamber 111 of tank 101. As an example, a user can select or establish a set-point temperature for water within chamber 111 of tank 101, or the set-point temperature for water within chamber 111 of tank 101 may be a default value. Based upon the set-point temperature for water within chamber 111 of tank 101, controller 134 can selectively activate heating elements 103 in order to heat water within chamber 111 of tank 101 to the set-point temperature for water within chamber 111 of tank 101. The set-point temperature for water within chamber 111 of tank 101 can be any suitable temperature. For example, the set-point temperature for water within chamber 111 of tank 101 may be between about one hundred and forty degrees Fahrenheit and about one hundred and eighty-degrees Fahrenheit.

Controller 134 can also operate mixing valve 120 to regulate the temperature of water within mixed water conduit 122. For example, controller 134 can adjust the position of mixing valve 120 in order to regulate the temperature of water within mixed water conduit 122. As an example, a user can select or establish a set-point temperature of mixing valve 120, or the set-point temperature of mixing valve 120 may be a default value. Based upon the set-point temperature of mixing valve 120, controller 134 can adjust the position of mixing valve 120 in order to change or tweak a ratio of relatively cool water flowing into mixed water conduit 122 from cold water conduit 104 and relatively hot water flowing into mixed water conduit 122 from hot water conduit 106. In such a manner, controller 134 can regulate the temperature of water within mixed water conduit 122.

The set-point temperature of mixing valve 120 can be any suitable temperature. For example, the set-point temperature of mixing valve 120 may be between about one hundred degrees Fahrenheit and about one hundred and twenty degrees Fahrenheit. In particular, the set-point temperature of mixing valve 120 may be selected such that the set-point temperature of mixing valve 120 is less than the set-point temperature for water within chamber 111 of tank 101. In such a manner, mixing valve 120 can utilize water from cold water conduit 104 and hot water conduit 106 to regulate the temperature of water within mixed water conduit 122.

Figure 3:
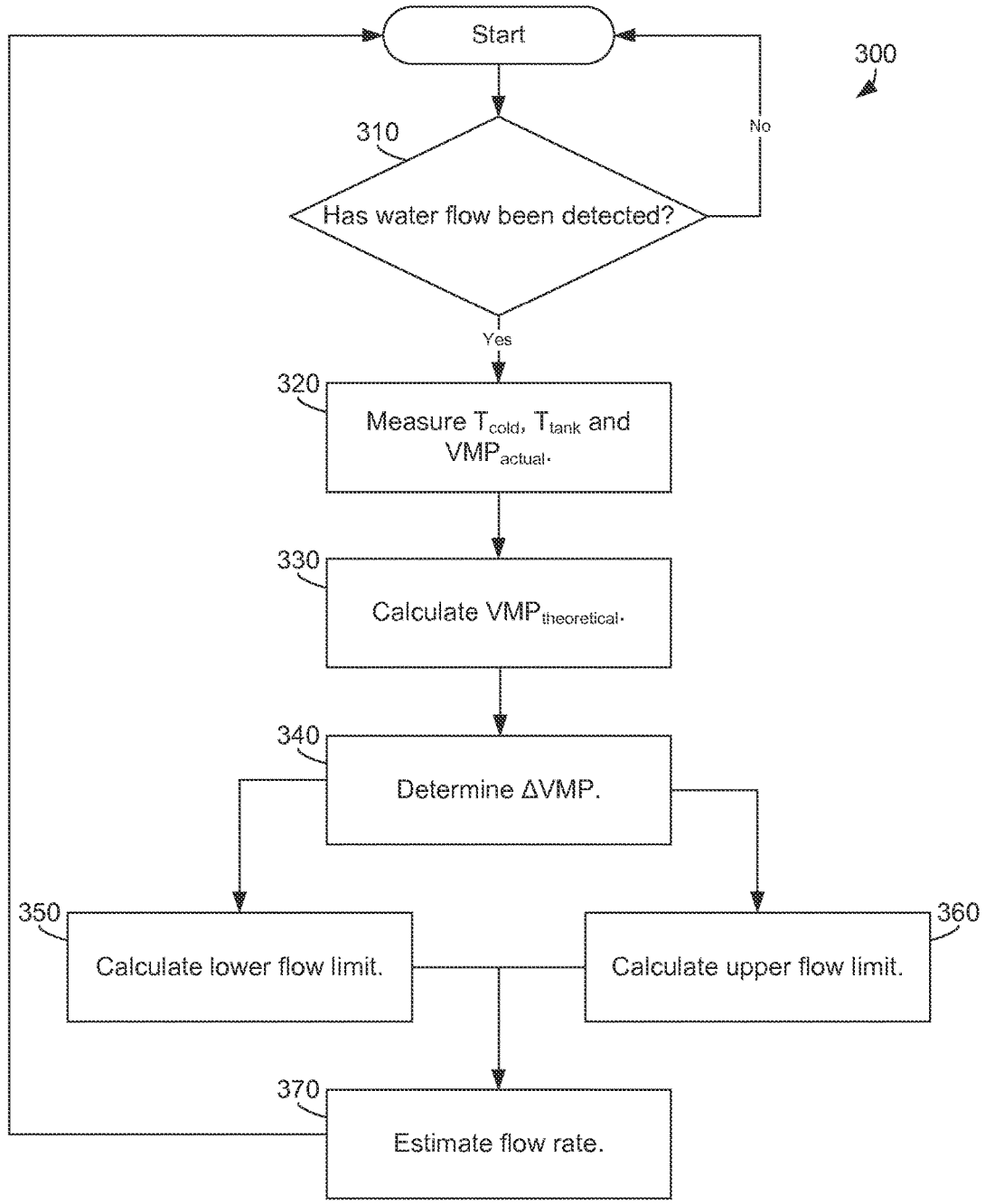
FIG. 3 illustrates a method for operating a water heater appliance according to an exemplary embodiment of the present subject matter.

FIG. 3 illustrates a method 300 for operating a water heater appliance according to an exemplary embodiment of the present subject matter. Method 300 can be used to operate any suitable water heater appliance. For example, method 300 may be utilized to operate water heater appliance 100 (FIG. 1), and controller 134 of water heater appliance 100 may be programmed to implement method 300. Thus, method 300 is described in greater detail below in the context of water heater appliance 100.

At step 310, controller 134 determines whether water is flowing through water heater appliance 100. Any suitable method or mechanism may be used to determine whether water flow is present within water heater appliance 100 at step 310. For example, the method described in U.S. Patent Publication No. 2015/0013622A1 of Brett Alan Farris et al., which is hereby incorporated by reference for all purposes, may be used to determine whether water is flowing through water heater appliance 100 at step 310.

As may be seen in FIG. 3, at step 320, a temperature, $T_{tank}$, of water within tank 101 of water heater appliance 100, a temperature, $T_{cold}$, of water at cold water conduit 104 of water heater appliance 100 and a measured or actual position, $VMP_{actual}$, of mixing valve 120 of water heater appliance 100 are measured or determined. As an example, controller 134 may measure $T_{tank}$ at step 320 with tank temperature sensor 133, and controller 134 may measure $T_{cold}$ at step 320 with cold water conduit temperature sensor 132. As another example, controller 134 may measure $T_{cold}$ with mixing conduit temperature sensor 130 at step 320, e.g., with mixing valve positioned (e.g., fully open or closed depending upon the arrangement of mixing valve 120) such that only water from cold water conduit 104 flows through mixing valve 120 to mixing conduit 122. Controller 134 may measure $VMP_{actual}$ at step 320 with position sensor 124 at step 320. As another example, controller 134 may measure or determine $VMP_{actual}$ at step 320 by referencing the last position to which controller 134 commanded mixing valve 120 prior to step 320.

At step 330, a theoretical position, $VMP_{theoretical}$, of mixing valve 120 is calculated. $VMP_{theoretical}$ may be a function of at least $T_{tank}$ and $T_{cold}$. For example, controller 134 may calculate $VMP_{theoretical}$ with the following at step 330

$$VMP_{theoretical} = \% \ ColdWater * FS + A$$

where $$\% \ ColdWater = \frac{c_{p,h}\Delta T_{tank}}{c_{p,c}\Delta T_{cold} + c_{p,h}\Delta T_{tank}} * 100;$$

$$\Delta T_{tank} = T_{tank} - T_{set};$$

$$\Delta T_{cold} = T_{set} - T_{cold};$$

$C_{p,h}$ is the specific heat of water at $T_{tank}$;
$C_{p,c}$ is the specific heat of water at $T_{cold}$;

$$FS = B - A;$$

A is the input to the mixing valve at a fully open position; and

B is the input to the mixing valve at a fully closed position.

$T_{set}$ corresponds to the set-point temperature for mixing valve 120. The input to mixing valve 120 may correspond to a current or voltage supplied to mixing valve 120 from controller 134. In turn, the current or voltage supplied to mixing valve 120 from controller 134 may be directly proportional to the position of mixing valve 120 and/or the ratio of cold water directed into mixing conduit 122 from cold water conduit 104 to heated water directed into mixing conduit 122 from hot water conduit 106 with mixing valve 120.

At step 340, a difference between $VMP_{actual}$ and $VMP_{theoretical}$, $\Delta VMP$, is determined or evaluated. As an example, controller 134 may subtract $VMP_{theoretical}$ from $VMP_{actual}$ at step 340 to calculate $\Delta VMP$. At step 350, a lower flow rate limit for water exiting water heater appliance 100 is established. Similarly, at step 360, an upper flow rate limit for water exiting water heater appliance 100 is established. The lower flow rate limit and the upper flow rate limit are each a function of at least $\Delta VMP$. As an example, the lower flow rate limit and the upper flow rate limit may each be univariate quadratic functions of $\Delta VMP$. In particular, controller 134 may establish the lower flow rate limit at step 350 with the flowing $$f_{lower}(\Delta VMP) = a*(\Delta VMP)^2 + b*\Delta VMP + c$$

where
$f_{lower}(\Delta VMP)$ is the lower flow rate limit; and
a, b and c are coefficients with
$0 < a \leq 0.5$, $-2 < b < 0.5$ and $1 < c < 3$.

In addition, controller 134 may establish the upper flow rate limit at step 360 with the flowing $$f_{upper}(\Delta VMP) = d*(\Delta VMP)^2 + e*\Delta VMP + f$$

where
$f_{upper}(\Delta VMP)$ is the upper flow rate limit; and
d, e and f are coefficients with
$0 < d \leq 0.5$, $-1 < e < 0$ and $0.5 < f < 2$.

It should be understood that the coefficients provided above may be determined empirically, e.g., by a manufacturer of water heater appliance 100, and stored within controller 134. Thus, the values of the coefficients provided above are provided by way of example only and may vary depending upon the particular arrangement of a water heater appliance operating under method 300.

At step 370, a flow rate of water through water heater appliance 100 is established, e.g., based at least in part on the lower flow rate limit from step 350 and the upper flow rate limit from step 360. As an example, controller 134 may average the lower flow rate limit from step 350 and the upper flow rate limit 360 in order to establish flow rate of water through water heater appliance 100 at step 370.

Figure 4:
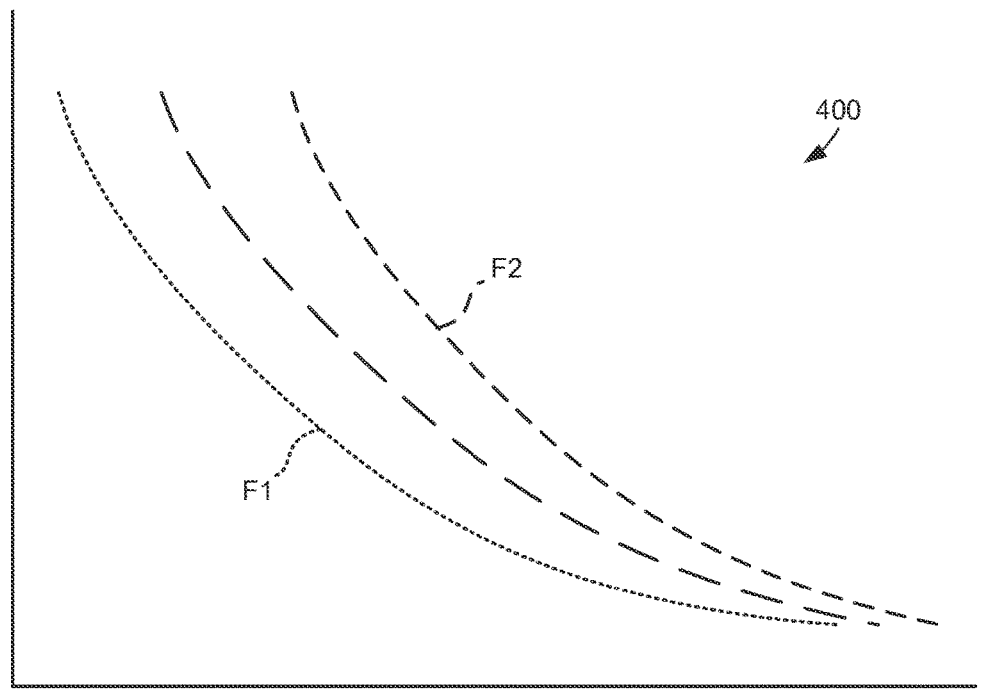
FIG. 4 illustrates an exemplary plot of a lower flow rate limit and an upper flow rate limit for a water heater appliance.

FIG. 4 illustrates an exemplary plot 400 with a lower flow rate limit F1 and an upper flow rate limit F2 for water heater appliance 100. The horizontal axis of plot 400 corresponds to $\Delta VMP$, and the vertical axis of plot 400 corresponds to the estimated flow rate of water through water heater appliance 100. The dashed line show between the lower flow rate limit F1 and the upper flow rate limit F2 corresponds to the average value of the lower flow rate limit F1 and the upper flow rate limit F2 at each respective value of $\Delta VMP$. As shown in FIG. 4, the estimated flow rate of water through water heater appliance 100 may be calculated for a variety of $\Delta VMP$.

Method 300 may assist with calculating the flow rate of water through water heater appliance 100 quickly and accurately. In addition, method 300 does not require a separate flow meter. Thus, water heater appliance 100 need not include a flow meter for measuring the flow rate of water through water heater appliance 100 at step 370. Proving the flow rate of water through water heater appliance 100 may allow performance of water heater appliance 100 to be improved and may provide an improved first-hour rating for water heater appliance 100. In particular, knowledge of the flow rate of water through water heater appliance 100 may accelerate a response time of water heater appliance 100, as will be understood by those skilled in the art.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a water heater appliance, the method comprising:
   determining a temperature, $T_{tank}$, of water within a tank of the water heater appliance, a temperature, $T_{cold}$, of water at an inlet conduit of the water heater appliance and an actual position, $VMP_{actual}$, of a mixing valve of the water heater appliance;

calculating a theoretical position, $VMP_{theoretical}$, of the mixing valve of the water heater appliance, the $VMP_{theoretical}$ being a function of at least the $T_{tank}$ and the $T_{cold}$;

evaluating a difference between the $VMP_{actual}$ and the $VMP_{theoretical}$, $\Delta VMP$;

establishing a lower flow rate limit for water exiting the water heater appliance and an upper flow rate limit for water exiting the water heater appliance, the lower flow rate limit and the upper flow rate limit each being a function of at least the $\Delta VMP$, wherein the mixing valve of the water heater appliance is opeerable to mix water from the inlet conduit of the water heater appliance with water from the tank of the water heater appliance.

2. The method of claim 1, wherein said step of determining comprises measuring the $T_{cold}$ by receiving a signal at a controller of the water heater appliance from a mixing valve temperature sensor positioned downstream of the mixing valve of the water heater appliance when the mixing valve of the water heater appliance is fully open or closed.

3. The method of claim 1, wherein said step of determining comprises measuring the $T_{cold}$ by receiving a signal at a controller of the water heater appliance from a cold water temperature sensor positioned on the inlet conduit of the water heater appliance.

4. The method of claim 1, wherein said step of calculating comprises calculating $VMP_{theoretical}$ with $$VMP_{theoretical} = \% \; ColdWater * FS + A$$

where $$\% \; ColdWater = \frac{c_{p,h}\Delta T_{tank}}{c_{p,c}\Delta T_{cold} + c_{p,h}\Delta T_{tank}} * 100;$$

$$\Delta T_{tank} = T_{tank} - T_{set};$$

$$\Delta T_{cold} = T_{set} - T_{cold};$$

$c_{p,h}$ is the specific heat of water at $T_{tank}$;
$c_{p,c}$ is the specific heat of water at $T_{cold}$;

$$FS=B-A;$$

A is the input to the mixing valve at a fully open positon; and

B is the input to the mixing valve at a fully closed positon.

5. The method of claim 1, wherein the lower flow rate limit and the upper flow rate limit are each univariate quadratic functions of the $\Delta VMP$.

6. The method of claim 5, wherein said step of establishing comprises establishing the lower flow rate limit with $$f_{lower}(\Delta VMP)=a*(\Delta VMP)^2+b*\Delta+c$$

where
$f_{lower}(\Delta VMP)$ is the lower flow rate limit; and
a, b and c are coefficients with $0<a\leq 0.5$, $-1<b<0$ and $0.5<c<2$.

7. The method of claim 5, wherein said step of establishing comprises establishing the upper flow rate limit with $$f_{upper}(\Delta VMP)=d*(\Delta VMP)^2+e*\Delta VMP+f$$

where
$f_{upper}(\Delta VMP)$ is the upper flow rate limit; and
d, e and f are coefficients with $0<d\leq 0.5$, $-2<e<0.5$ and $1<f<3$.

8. The method of claim 1, further comprising estimating a flow rate of water through the water heater appliance based at least in part on the lower flow rate limit and the upper flow rate limit.

9. The method of claim 8, wherein said step of estimating comprises averaging the lower flow rate limit and the upper flow rate limit.

10. The method of claim 1, wherein the mixing valve is positioned within a casing of the water heater appliance.

11. A method for operating a water heater appliance, the water heater appliance having a mixing valve positioned within a casing of the water heater appliance, the method comprising:

determining a temperature, $T_{tank}$, of water within a tank of the water heater appliance, a temperature, $T_{cold}$, of water at an inlet conduit of the water heater appliance and an actual position, $VMP_{actual}$, of the mixing valve of the water heater appliance;

calculating a theoretical position, $VMP_{theoretical}$, of the mixing valve of the water heater appliance, the $VMP_{theoretical}$ being a function of at least the $T_{tank}$ and the $T_{cold}$;

evaluating a difference between the $VMP_{actual}$ and the $VMP_{theoretical}$, $\Delta VMP$;

establishing a lower flow rate limit for water exiting the water heater appliance and an upper flow rate limit for water exiting the water heater appliance, the lower flow rate limit and the upper flow rate limit each being a function of at least the $\Delta VMP$; and estimating a flow rate of water through the water heater appliance based at least in part on the lower flow rate limit and the upper flow rate limit, wherein the mixing valve of the water heater appliance is configured for mixing water from the inlet conduit of the water heater appliance with water from the tank of the water heater appliance.

12. The method of claim 11, wherein said step of determining comprises measuring the $T_{cold}$ by receiving a signal at a controller of the water heater appliance from a mixing valve temperature sensor positioned downstream of the mixing valve of the water heater appliance when the mixing valve of the water heater appliance is fully open or closed.

13. The method of claim 11, wherein said step of determining comprises measuring the $T_{cold}$ by receiving a signal at a controller of the water heater appliance from a cold water temperature sensor positioned on the inlet conduit of the water heater appliance.

14. The method of claim 11, wherein said step of calculating comprises calculating $VMP_{theoretical}$ with $$VMP_{theoretical} = \% \; ColdWater * FS + A$$

where $$\% \; ColdWater = \frac{c_{p,h}\Delta T_{tank}}{c_{p,c}\Delta T_{cold} + c_{p,h}\Delta T_{tank}} * 100;$$

$$\Delta T_{tank} = T_{tank} - T_{set};$$

$$\Delta T_{cold} = T_{set} - T_{cold};$$

$c_{p,h}$ is the specific heat of water at $T_{tank}$;
$c_{p,c}$ is the specific heat of water at $T_{cold}$;

$$FS=B-A;$$

A is the input to the mixing valve at a fully open positon; and

B is the input to the mixing valve at a fully closed positon.

15. The method of claim 11, wherein the lower flow rate limit and the upper flow rate limit are each univariate quadratic functions of the ΔVMP.

16. The method of claim 15, wherein said step of establishing comprises establishing the lower flow rate limit with $$f_{lower}(\Delta VMP)=a*(\Delta VMP)^2+b*\Delta VMP+c$$

where $f_{lower}(\Delta VMP)$ is the lower flow rate limit; and
a, b and c are coefficients with $0<a\leq0.5$, $-1<b<0$ and $0.5<c<2$.

17. The method of claim 15, wherein said step of establishing comprises establishing the upper flow rate limit with $$f_{upper}(\Delta VMP)=d*(\Delta VMP)^2+e*\Delta VMP+f$$

where $f_{upper}(\Delta VMP)$ is the upper flow rate limit; and
d, e and f are coefficients with $0<d\leq0.5$, $-2<e<0.5$ and $1<f<3$.

18. The method of claim 11, wherein said step of estimating comprises averaging the lower flow rate limit and the upper flow rate limit.

19. The method of claim 11, wherein the water heater appliance does not include a flow meter for measuring the flow rate of water through the water heater appliance.

20. The method of claim 11, wherein said steps of calculating, evaluating, establishing and estimating are performed by a controller of the water heater appliance.

* * * * *

UNITED STATES PATENT AND TRADEMARK OFFICE
CERTIFICATE OF CORRECTION

PATENT NO.         : 9,885,497 B2
APPLICATION NO.    : 14/692803
DATED              : February 6, 2018
INVENTOR(S)        : Shaun Michael Ward et al.

Page 1 of 1

It is certified that error appears in the above-identified patent and that said Letters Patent is hereby corrected as shown below:

Claim 1: In Column 9, Line 13 - "opeerable" should read "operable".

Signed and Sealed this
Fourteenth Day of August, 2018

Andrei Iancu
*Director of the United States Patent and Trademark Office*